Dec. 14, 1948.　　　　J. W. WOOD　　　　2,456,100
TOGGLE CLAMP
Filed June 4, 1945
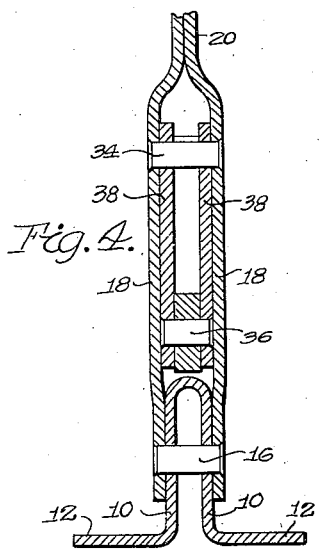
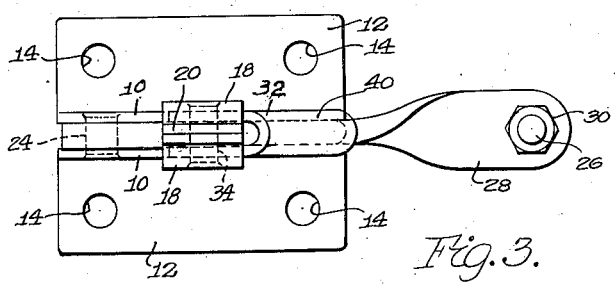
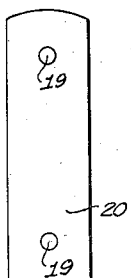
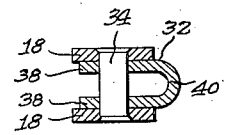
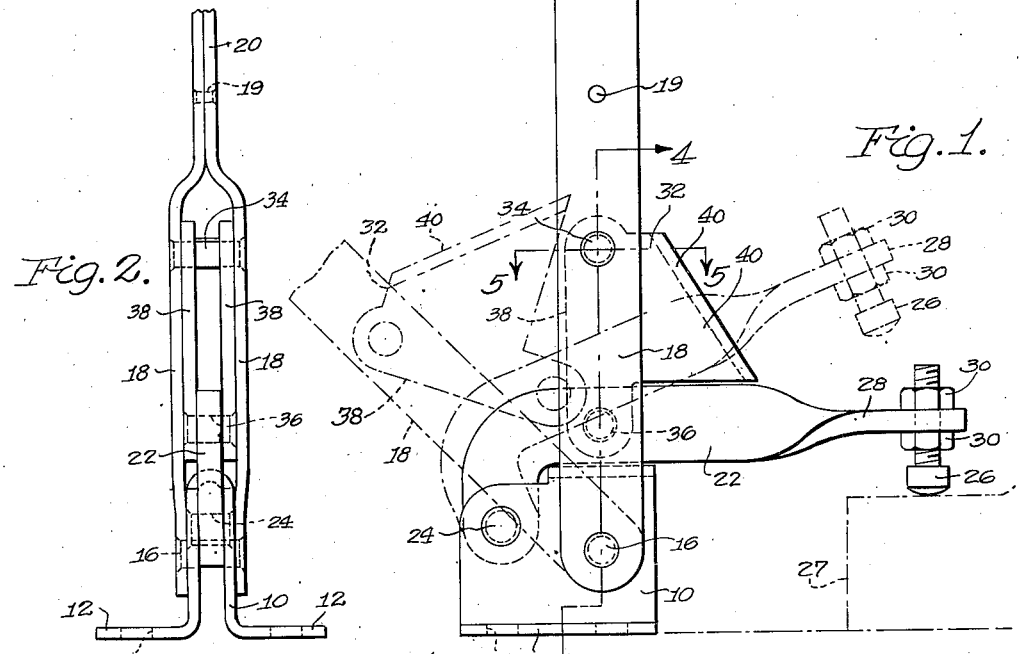
Inventor
Justice W. Wood
by A. E. Wilson
Att'y Patented Dec. 14, 1948

2,456,100

UNITED STATES PATENT OFFICE 2,456,100

TOGGLE CLAMP

Justice W. Wood, Detroit, Mich.

Application June 4, 1945, Serial No. 597,499

1 Claim. (Cl. 144—290)

This invention relates to clamping devices, and particularly to a toggle clamp which may be quickly applied for the purpose of holding a plurality of parts in fixed relation to each other.

An object of the invention is to provide an improved and efficient clamp which may be economically manufactured and assembled.

A further object of the invention is to provide an improved clamp of simple and sturdy design, which may be quickly applied and which will hold the parts positively in their assembled relation.

A further object of the invention is to provide an improved clamp wherein the elements are formed of strap steel or the like to facilitate their manufacture by simple stamping operations.

A further object of the invention is to provide an improved clamp wherein the elements are held in the clamping position by means of an element formed of sheet steel, which will be stronger and less subject to wear and deformation than are the corresponding elements of the usual clamps.

Other objects and advantages of this invention will be apparent from the following detailed description considered in connection with the accompanying drawings, submitted for purposes of illustration only and not intended to define the scope of the invention, reference being had for that purpose to the subjoined claim.

In the drawings wherein similar reference characters refer to similar parts throughout the several views:

Fig. 1 is a view in side elevation of a toggle clamp embodying one form of the invention, the elements of the clamp being shown in full lines in the clamping position, and in broken lines in the released position of the clamp.

Fig. 2 is a view of the same in rear elevation.

Fig. 3 is a plan view of the same.

Fig. 4 is a sectional view taken on the line 4—4 of Fig. 1.

Fig. 5 is a horizontal sectional view taken on the line 5—5 of Fig. 1.

Fig. 6 is a view of a modified form of clamping arm.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now specifically to the drawings, the clamp comprises a base member formed of sheet steel and comprising a vertically extending loop 10 and a rectangular base plate 12, the latter being provided with securing means such as drilled holes 14 whereby it may be secured to a bench or other support.

Pivoted to the loop 10 by means of a pin 16 is an operating lever, formed of two spaced arms 18 which are joined at their upper ends by means of rivets 19 to form a handle 20. A clamping arm 22 is pivoted to the loop 10 rearwardly of the pin 16, by means of a pin 24, and extends upwardly therefrom and thence horizontally, terminating in an adjustable element 26 which is designed to engage the work, indicated generally at 27. The arm 22, like the other members of the clamp, is formed of sheet steel and is disposed generally in a vertical plane, but with the forward end of the arm twisted, as by cold working, into a horizontal flange 28. Through an aperture in this flange 28 extends the element 26, which may be in the form of a bolt, with adjusting nuts 30 disposed on opposite sides of the flange to permit adjustment of the work-engaging element relative to the work.

A link 32 is pivotally connected by means of pins 34, 36 to the levers 18 and the clamping arm 22, and is of such length that when the lever 18 is in vertical position, as shown in Fig. 1, the clamping arm 22 will be in substantially horizontal position, and the pin 36 will be in line with pins 34 and 16, so that the reaction of the clamping force, tending to rotate the clamping arm 22 in the counterclockwise direction about pin 24, will have no turning moment tending to rotate the link 32 in the counterclockwise direction about pin 34 and thus release the clamp. Further movement of the levers 18 in the clockwise direction about pin 16, as viewed in Fig. 1 will result in movement of the elements past dead-center position, but will be limited by the link 32 as hereinafter discussed.

The link 32 is formed of sheet metal, which is bent in such a manner as to provide two parallel flanges 38, with a loop 40 connecting the two. The loop 40 is inclined as shown, with its lower end extending forwardly of the levers 18 so as to form a stop designed to contact the upper edge of the clamping arm 22 when the levers 18 are rotated slightly past their dead-center position shown in Fig. 1. When the loop 40 thus engages the clamping arm 22, the clamp is held in its retaining position not only by the alignment of pins 34, 36 and 16 but also by pressure exerted by the link directly upon the clamping arm; and since the lower edge of loop 40 is less subject to wear in use than the pivot pins there will be but little play developed between the parts as the clamp is used.

It will be noted from Fig. 1 that the loop 40 extends forwardly by a considerable distance from the plane of pins 34, 36 and 16, and thus serves to reinforce the clamping lever 22, which is in the form of a cantilever beam. The loop thus serves to take a portion of the stress otherwise borne by the pivot pins.

Where greater rigidity is required than that obtained by a lever of the design of lever 22, the clamping lever may be formed as indicated at 42 in Fig. 6, of an L-shaped member of strap steel disposed wholly in the vertical plane, and with a reinforcing projection 44 on its upper edge to compensate for the metal removed to form the pivot hole 43, which receives pivot pin 36. The clamping head to be used with this clamping arm may consist of a clevis 45 having arms extending on opposite sides of the clamping arm and secured in position by a transverse bolt 46. The lower portion of the clevis may be threaded, as shown, to receive a nut 48 having its nether surface rounded or otherwise suitably shaped to engage the work.

In both forms of the invention, the parts may be formed from sheet steel in strap form by simple stamping operations, or other cold-working operations, the metal being of such hardness as to give the desired rigidity while not preventing its being easily worked.

It will be apparent that in moving the parts from the positions shown in broken lines in Fig. 1 to the positions shown in full lines in the same figure, the mechanical advantage of the force applied to the handle 20 in producing downward movement of the work-engaging element 26 will increase as the full-line position is approached, so that the maximum clamping force will be exerted when the handle 20 reaches the vertical position.

I claim:

A toggle clamp comprising a base formed of sheet metal and having spaced parallel flanges connected by an integral loop, a clamping arm formed of sheet metal and having one end pivotally connected to said base between said flanges below said loop and extending substantially horizontally over said loop, a clamping head adjustably mounted at the other end of said arm, a handle formed of sheet metal and having one end bifurcated and embracing said flanges, a pivot connecting said end of the handle to said base forwardly of the connection between the base and the clamping arm, a link formed of sheet metal and comprising spaced parallel flanges straddling the clamping arm and connected by an integral loop, a pivot connecting one end of the link to the handle, and a pivot connecting the other end of the link to the clamping arm intermediate its end, said last mentioned loop being recessed from the ends of the link so as to permit free pivoting of the clamping arm and the handle.

JUSTICE W. WOOD.

REFERENCES CITED

The following references are of record in the file of this patent:

UNITED STATES PATENTS

| Number | Name | Date |
|---|---|---|
| 2,236,439 | McKenna | Mar. 25, 1931 |
| 2,054,572 | McKenna | Sept. 15, 1936 |
| 2,350,034 | Herrington | May 30, 1944 |
| 2,386,567 | Olson | Oct. 9, 1945 |

Certificate of Correction

Patent No. 2,456,100.  December 14, 1948.

JUSTICE W. WOOD

It is hereby certified that error appears in the printed specification of the above numbered patent requiring correction as follows:

Column 4, line 24, in the claim, for the word "end" read *ends*;

and that the said Letters Patent should be read with this correction therein that the same may conform to the record of the case in the Patent Office.

Signed and sealed this 22nd day of March, A. D. 1949.

[SEAL]

THOMAS F. MURPHY,
*Assistant Commissioner of Patents.*